Patented June 9, 1942

2,285,410

UNITED STATES PATENT OFFICE 2,285,410

PEST CONTROL

Euclid W. Bousquet, Wilmington, and Hubert G. Guy, Newark, Del., assignors to E. I. du Pont de Nemours & Company, Wilmington, Del., a corporation of Delaware No Drawing. Application February 27, 1941, Serial No. 380,768

17 Claims. (Cl. 167—33)

This invention relates to pest control and is particularly directed to methods and compositions for preventing or arresting infestations of insects and other pestiferous organisms, such as fungi, bacteria, protozoa, and molds, which are economically harmful to man and which commonly infest organic matter whether plant or animal, or of plant or animal origin, either in the natural, fabricated or synthetic state; which methods and compositions distinguish from the methods and compositions known heretofore in the use of a 1,2,4-thiadiazole and especially the esters and salts of perthiocyanic acid (1,2,4-thiadiazole-3,5-dithiol) as an essential active ingredient.

The demand for a relatively cheap, non-poisonous and stable insecticide has steadily increased in the last decade as a result of the intensified agricultural methods leading to production of quality products at relatively lower prices. The invasion of new insect pests such as the Japanese beetle and various immunities developed among some of the better known types of insects have continuously intensified demand for a pesticide fulfilling the above specifications. For the lack of better materials, the arsenicals, fluosilicates, and other poisonous and hazardous materials have been used in excessively high amounts in an attempt to control economic pests. Less hazardous but possessing the disadvantage of instability under atmospheric conditions, derris extracts and pyrethrum have also come into limited use in recent years. A wide range of successful applicability on a number of various insects is a rare property possessed by very few organic materials. The thiadiazoles of this invention, however, seem to possess this characteristic in that they are toxic to a variety of insects with more than ordinary efficiency. Furthermore, they appear to be relatively non-poisonous, stable, and can be prepared from relatively cheap raw materials. Another useful characteristic is their solubility in organic solvents and oils which extends their range of usefulness.

The 1,2,4-thiadiazoles are heterocyclic compounds containing a 5-membered ring composed of two carbon atoms, two nitrogen atoms, and one sulfur atom arranged as shown in the following formula:

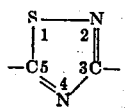

When the extranuclear carbon valences are satisfied by divalent sulfur the compounds are known as perthiocyanates. Perthiocyanic acid is known only in the form of its salts and esters and may be represented by the formula:

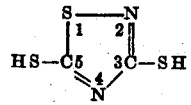

It is isomeric with xanthane hydride and rapidly changes over to xanthane hydride in acid solutions. In basic solutions salts are formed either by neutralization, double decomposition or addition, depending upon the nature of the base and the presence or absence of other reactive materials. Esters likewise may be formed if a suitable basic solution is treated with a suitable esterifying agent. Thus the hydrogen atoms may be replaced by a wide variety of radicals. Typical of these are alkyl, aralkyl, carbalkoxyalkyl, copper, aluminum, iron, magnesium, zinc, tin, calcium, sodium, and the like. The invention in its broadest aspects is not limited to perthiocyanates but contemplates 1,2,4-thiadiazoles in which other monovalent radicals occupy the 3 and 5 positions. We conceive that the toxicity of our active pest control agents is intimately associated with the heterocyclic structure illustrated above as characteristic of the 1,2,4-thiadiazoles.

The preferred products of this invention may be obtained from such cheap raw materials as ammonium thiocyanate or alkali metal thiocyanates. Treatment of these inorganic thiocyanates with a suitable acid produces xanthane hydride. The esters of perthiocyanic acid of this invention may be readily prepared from the xanthane hydride by first converting to a perthiocyanic acid salt such as with alkalies; e. g. sodium or potassium hydroxides, sodium ethylate, or ammonia. The resulting salt is then converted to the esters by treatment with organic halides, dialkyl sulfates, and like esterifying agents. The esters are usually high-boiling oils or low-melting solids soluble in acetone, alcohol, benzene and most hydrocarbon oils. Thus there may be easily provided a series of esters in which the substituents at positions 3 and 5 attached to the sulfur atoms may be alkyl, cycloalkyl, aralkyl, alkoxyalkyl, aryloxyalkyl, carbethoxyalkyl, hydroxyalkyl, and other univalent organic radicals.

Likewise a series of salts are easily provided ranging from the alkali metal and alkaline earth metal salts through the heavy metal salts. The water-insoluble metal perthiocyanates are generally prepared by double decomposition of an alkali metal perthiocyanate with a water-soluble inorganic metal salt. It is also possible to prepare some of these salts by direct treatment of the xanthane hydride with a basic metal oxide.

In like manner various amine salts may be produced by double decomposition of an amine salt such as the sulfate, with a heavy metal salt of perthiocyanic acid, preferably calcium, barium or lead. Choice of solvents for conducting the above reaction is largely dependent on solubility factors favorable to precipitation of the desired salt. In this manner various amine salts may be prepared from such amines as aniline, piperidine, dodecylamine, dicyclonexylamine, guanidine and the like.

The pest control agents of this invention prepared as outlined above may be incorporated in suitable compositions according to their intended use as an insecticide or insectifuge, foliage protectant, protectant for textile fabrics especially woolens, as fly sprays, a poison bait, or otherwise. Suitable methods of preparation and suitable compositions are illustrated in the following examples:

Example 1

Dimethyl perthiocyanate (3,5-di(methylthio)-1,2,4-thiadiazole) prepared according to one or the other of the following methods may be milled with an equal quantity of bentonite to provide a free-flowing, water dispersible powder suitable for preparing aqueous dispersions.

(a) One hundred and fifty parts of xanthane hydride, 90 parts of sodium hydroxide, and 450 parts of water are heated to boiling until the solution is practically clear, whereupon it is treated with animal charcoal (15 parts) and filtered. To the stirred filtrate at a temperature 10–15° C. is slowly added 252 parts of dimethyl sulfate keeping the temperature below 15° C. during this addition. Heating at 40–45° C. is then continued for 1 hour. The resulting oily layer is extracted with ether, the ether extract is water-washed and dried over anhydrous sodium sulfate, and then filtered from the drying agent. On evaporation of the ether, 157 parts of yellow oil are obtained. Cooling this oil in an ice-salt bath and adding 150 parts of methyl alcohol yields 115 parts of cream colored crystals melting at 39–41° C. (64.5% of the theoretical yield).

(b) Alternatively a solution of 8 parts of sodium hydroxide and 100 parts of water is gradually added to a mixture of 15 parts of xanthane hydride and 25 parts of dimethyl sulfate while a low temperature is maintained with ice. The yellow oil which forms is extracted with ether from the ether-insoluble xanthane hydride. On removal of the ether and cooling of the residue 10 parts of yellow needles of the ester are obtained.

This product may also be precipitated on talc to form a dusting composition, or it may be dissolved in kerosene of fly spray grade together with 30 or 40 mgs. of pyrethrum per 100 cc. to form an effective fly spray. One to five per cent of dimethyl perthiocyanate is suitable. Additionally the product may be incorporated in dry-cleaning solvents such as Stoddard's solvents or may be incorporated in other solvents such as acetone for application to fabrics for protection against damage by insect pests.

Example 2

Di(carbethoxy)perthiocyanate (3,5-di(carbethoxy-methylthio)-1,2,4-thiadiazole) prepared as described below may be made up into a water-dispersible free-flowing powder by milling 80 parts with 19 parts Bancroft clay and 1 part "Duponol" (the sodium salts of sulfated higher alcohols).

Thirty parts of xanthane hydride are dissolved in a stirred alcohol solution of sodium ethylate made by dissolving 9.2 parts of sodium and 150 parts of absolute ethyl alcohol. To this mixture a solution of 40 parts of absolute ethyl alcohol and 67 parts of ethyl bromoacetate is added while maintaining a reflux reaction. The reaction is continued for one hour at refluxing temperature after mixture of the reagents. From the cooled reaction mixture sodium bromide is removed by filtration, and removal of the ethyl alcohol by evaporation from the resulting filtrate is continued until the volume of the solution amounts to approximately 100 parts. Addition of 100 parts of ice to this solution precipitates a yellowish solid which is filtered from the cooled solution. The solid is dissolved in ether and scrubbed with water after which the ether extract is dried over anhydrous sodium sulfate and treated with animal charcoal. Filtration of this ether solution from the charcoal and drying agent, and removal of the ether leaves an oil to which 80 parts of methyl alcohol are added. On cooling this mixture to 0° C. a white precipitate amounting to 30 parts and melting at 70.5–72° C. is obtained.

This product can also be made up in other suitable compositions in the same manner as dimethyl perthiocyanate.

Example 3

Didodecyl perthiocyanate (3,5-di(dodecylthio)-1,2,4-thiodiazole) prepared as described below is milled with twice its weight of bentonite and sufficient n-dodecyl alcohol to provide 1% based on the weight of the mixture to provide a free-flowing water-dispersible product suitable for preparing aqueous dispersions.

A similar procedure to Example 2 is used for the preparation of the subject product using 23 parts of xanthane hydride and 7 parts of sodium dissolved in 150 parts of ethyl alcohol. The boiling perthiocyanate solution is treated with 75 parts of dodecyl bromide in the course of 20 minutes and the mixture is refluxed for 5 hours. Removal of impurities by water-washing and drying by the general method of the preceding examples gives 60 parts of a light yellow oil which on recrystallization from alcohol yields white crystalline leaflets melting at 34–35° C.

This product applied in aqueous spray at 1 to 200 effected 33% control of codling moth as compared with 50% control obtained by lead arsenate applied under the same conditions and at the same concentration.

Example 4

Di(trichlorobenzyl)perthiocyanate (3,5-di(trichlorobenzylmethylthio)-1,2,4-thiadiazole prepared as described below may be milled with twice its weight of bentonite to provide a free-flowing water-dispersible powder suitable for preparing dispersions.

Using the general procedure of Examples 2 and 3, the above product is prepared from 25 parts of xanthane hydride, 7 parts of sodium, 150 parts of absolute alcohol, and 70 parts of trichlorobenzyl chloride (crude). After refluxing for 2.5 hours the precipitated sodium chloride is removed by filtration and the light yellow oil obtained upon evaporation of the filtrate is taken up in ether and washed first with sodium carbonate solution and then water. Following the drying and decolorization operations low boiling products are removed by distillation (110° C./3 mm.) and the resulting residual yellow oil amounts to 43 parts.

*Example 5*

Diethyl perthiocyanate (3,5 - di(ethylthio) - 1,2,4-thiadiazole) prepared as described below may be made up into a concentrated emulsion suitable for preparing aqueous dispersions by dissolving it in an equal quantity of a light plant spray oil (65 sec. Saybolt) and emulsifying it in a colloid mill with an equal quantity of water containing casein solubilized with borax.

A solution of sodium perthiocyanate made by boiling 60 parts of xanthane hydride and 40 parts in sodium hydroxide and 200 parts of water is treated with animal charcoal and filtered. To this cooled (10° C.) solution is then added 125 parts of diethyl sulfate while stirring and maintaining the temperature at 10–15° C. Heating is continued at 50–60° C. for 1 hour after mixture of the above reagents and then the reaction is allowed to stand at room temperature for 2 hours. Sixty-two parts of yellow oil are obtained (75% of the theoretical yield) after the usual washing and drying processes. This oil on distillation boils at 123–125° C./2 mm. and is colorless and practically odorless.

Applied to bean foilage infested with Mexican bean beetle it inhibited substantially all feeding (only 5% eaten).

*Example 6*

Diethyl perthiocyanate prepared as above is made up into a mothproofing composition by dissolving 2% in acetone. Woolen fabric impregnated from this solution and exposed to moth larvae for two weeks under conditions in which untreated check fabric was 95% damaged showed no damage and all the larvae died.

In place of diethyl perthiocyanate, dimethyl, di(trichlorobenzyl), and calcium perthiocyanates may be substituted in the above composition. The aluminum and tin perthiocyanates may be applied to wool as saturated solutions in acetone and likewise give excellent protection against moth damage.

*Example 7*

Diethyl perthiocyanate may be made up into a fly spray dissolving 4 grams in 100 cc. of kerosene containing 30 mg. pyrethrum. Applied in a standard Peet-Grady chamber this spray gave 93% down after 10 minutes and 86% kill after 24 hours as compared with 79 and 7, respectively, for the 30 mgs. pyrethrum spray.

In place of diethyl perthiocyanate there may be substituted dimethyl dibenzyl, didodecyl, and ditrichlorobenzyl perthiocyanate and the concentrations may range from 1 to 5% depending upon the amount of pyrethrum.

*Example 8*

Dibenzyl perthiocyanate (3,5-di(benzylthio) - 1,2,4-thiadiazole) prepared according to one or the other of the following methods may be made up into a free-flowing water-dispersible product by milling 1 part with 3 parts of an equal mixture of tricalcium phosphate and bentonite.

(a) Using the general procedure outlined in Example 1, an aqueous solution of potassium perthiocyanate from 45 parts of xanthane hydride and 42 parts of potassium hydroxide is treated with 76 parts of benzyl chloride and a trace of "Duponol" dispersing agent (the sodium salts of sulfated higher alcohols) and heated on the steam bath for 2 hours with stirring. Eighty-seven parts of a yellow oil is obtained after scrubbing and drying.

(b) As in Example 2, 45 parts of xanthane hydride are added to a stirred sodium ethylate solution made by dissolving 14 parts of sodium and 375 parts of absolute ethyl alcohol. To this solution under reflux, 76 parts of freshly distilled benzyl chloride is slowly added while maintaining a refluxing temperature. After heating for 1.5 hours the resulting reaction mixture is evaporated on the steam bath. After water-washing and drying over anhydrous sodium sulfate, a yellow oil amounting to 87 parts is obtained.

Applied as an aqueous spray at a cencentration of 1 to 400 to smartweed foilage infested with Japanese beetles as described in Patent 2,205,232, the product was approximately 91% as effective as lead arsenate in killing power and allowed even less foliage damage (11% foliage injury as compared with 15%) than the arsenical.

*Example 9*

A polysulfide from oxidized perthiocyanic acid prepared as described below, in accordance with the following scheme,

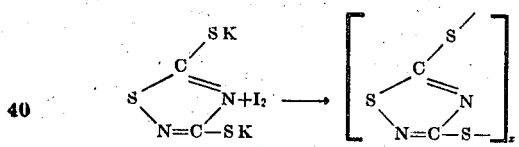

may be made up into a water-dispersible free-flowing powder by milling with ¼ of its weight of Bancroft clay.

A cold solution of potassium perthiocyanate made by boiling a solution of 30 grams of xanthane hydride, 28 grams of potassium hydroxide and 225 cc. water is treated at room temperature while stirring with a solution of 102 grams of iodine, 80 grams of potassium iodide and 250 cc. of water. The resulting mixture is treated with a small amount of sodium bisulfite to remove the excess iodine and the yellow precipitate filtered, washed with water and dried. This yellow powder amounts to 56 grams and analyzes 60.57 per cent sulfur as compared to a calculated value for this element of 64.9 per cent.

This product applied in aqueous spray at 1 to 100 to smartweed foliage infested with Japanese beetle as outlined above was substantially as effective as lead arsenate in preventing feeding.

*Example 10*

Aluminum perthiocyanate (aluminum salt of 1,2,4-thiadiazole-3,5-dithiol) prepared as described below is made up into a free-flowing water-dispersible powder by milling 80 parts with 14 parts of tricalcium phosphate, 5 parts bentonite, and 1 part n-dodecyl alcohol.

To a boiling solution of 45 parts of xanthane hyaride, 24 parts of sodium hydroxide, and 200 parts of water, is added a solution of 67 parts of aluminum sulfate $(Al_2(SO_4)_3 \cdot 18H_2O)$ and 300 parts of water. Heating is continued on the steam bath for 1.5 hours. The resulting yellow precipitate after filtration, water-washing and air-drying amounts to 50 parts of a bright yellow product soluble in acetone but insoluble in water.

This product applied in aqueous spray at 1 to 400 to smartweed foliage infested with Japanese beetle as outlined above was more effective as a feeding inhibitor than lead arsenate at the same concentration (18% foliage eaten as compared with 25%).

*Example 11*

Calcium perthiocyanate (calcium salt of 1,2,4-thiadiazole-3.5-dithiol) prepared as described below may be dissolved in acetone to 2% and used to impregnate woolen fabric. Test samples so impregnated and exposed to moth larvae for two weeks showed only 4% damage under conditions in which untreated checks were 88% damage. At the same time all the larvae were killed whereas only 5% died in the untreated check tests.

Treatment of a cold solution of sodium perthiocyanate made by boiling 45 parts of xanthane hydride, 200 parts of water and 24 parts of sodium hydroxide is treated with 33.3 parts of calcium chloride in 100 parts water. The resulting solution is evaporated to dryness giving a light yellow oil which appears to be hygroscopic. After drying in an oven at 100° C., 58 parts of a yellow viscous oil is obtained by extraction therefrom with methyl alcohol.

*Example 12*

In place of calcium perthiocyanate in Example 11, there may be substituted tin perthiocyanate (tin salt of 1,2,4-thiadiazole-3,5-dithiol) prepared as follows:

A solution of 22.5 parts of stannous chloride ($SnCl_2 \cdot 2H_2O$) in 100 parts of water is added to a solution of sodium perthiocyanate made by boiling 30 parts of xanthane hydride, 16 parts of sodium hydroxide and 200 parts of water and heated for ½ hour on a steam bath. After cooling, the gray precipitate is filtered, washed with water, and air dried and amounts to 42 parts.

The tin salt may also be substituted for the aluminum salt in Example 10.

Copper, zinc and iron salts may be prepared and compounded by procedures similar to the above examples. The copper salt is green, the zinc salt is grayish-white and the iron salt is rust-colored. The magnesium salt may be prepared according to the following example.

*Example 13*

To a solution of 26 parts of calcium perthiocyanate from the above Example 11 and 115 parts of water is added a solution of 16.5 parts of magnesium sulfate and 200 parts of water and the whole boiled for ½ hour. The above hot solution was evaporated and 25 parts of yellow salt was obtained after drying at 100° C.

The foregoing examples illustrate the wide variety of compounds coming within the invention and also various typical applications together with suitable methods and compositions therefor. In these various applications the pest control agents of the invention may be used either alone or in various combinations with other auxiliary materials including spreaders, stickers, and other insecticidal toxicants. For example, we propose to use the metallic arsenates, fluosilicates, phenothiazines, organic thiocyanates, nicotine, rotenone, hellbore, pyrethrum, isobutylundecyclenamide, aminomethyl sulfides, and other insecticides. Similarly, they may be used in combination with bactericides and fungicides such as the chlorinated phenols, aminomethyl sulfides, copper acylacetonates, copper chelates of beta-ketoacids, copper chelates of salicylaldehyde, Burgundy mixture, Bordeaux mixture, and the quaternary ammonium halides whenever it is desired to effect simultaneous control of diverse pests. They may be used either in the form of solutions such as aqueous sprays, dispersed with wetting agents, such as the sodium salts of the sulfated higher alcohols, sodium or potassium oleate, the sulfonated fish oils, or sulfonated petroleum oils; as dusts such as talc or bentonite dusts; and with organic solvents such as trichlor- or tetrachlorethylene, Stoddard solvent, and other hydrocarbon solvents. Their use with vegetable and mineral oils such as petroleum oils and vegetable oil glycerides is also contemplated as well as their use with various adhesives and sticking materials such as rosin, glue, and the like.

The pest control agents of this invention find a wide range of applications as pest control agents in various insecticides, and insectifuges, foliage protectants, protectants for various textile fabrics from pest destruction (especially woolen fabric), and as ingredients of fly sprays, particularly the hydrocarbon oil fly sprays as well as the toxic ingredients in baits either with or without attractants. They are particularly suitable for the protection of woolen fabric from the destructive effects of moth larvae, for use in fly sprays, and for the protection of foliage against chewing insects such as Japanese beetles and Mexican bean beetles.

We claim:

1. A pest control composition containing as an essential active ingredient a 1,2,4-thiadiazole.

2. A pest control composition containing as an essential active ingredient a perthiocyanate.

3. An insecticidal composition containing as an essential active ingredient an ester of perthiocyanic acid.

4. A pest control composition containing as an essential active ingredient a salt of perthiocyanic acid.

5. The method of protecting organic matter from the attack of insect pests which comprises applying to said matter a 1,2,4-thiadiazole.

6. The method of protecting organic matter from the attack of insect pests which comprises applying to said matter a perthiocyanate.

7. The method of protecting organic matter from the attack of insect pests which comprises applying to said matter a salt of perthiocyanic acid.

8. The method of protecting organic matter from the attack of insect pests which comprises applying to said matter an ester of perthiocyanic acid.

9. A pest control composition containing as an essential active ingredient dimethyl perthiocyanate.

10. A pest control composition containing as an essential active ingredient dibenzyl perthiocyanate.

11. A pest control composition containing as an essential active ingredient aluminum perthiocyanate.

12. An insecticidal composition containing as an essential active ingredient dimethyl perthiocyanate.

13. An insecticidal composition containing as an essential active ingredient dibenzyl perthiocyanate.

14. An insecticidal composition containing as an essential active ingredient aluminum perthiocyanate.

15. The method of protecting organic matter from the attack of insect pests which comprises applying dimethyl perthiocyanate.

16. The method of protecting organic matter from the attack of insect pests which comprises applying dibenzyl perthiocyanate.

17. The method of protecting organic matter from the attack of insect pests which comprises applying aluminum perthiocyanate.

EUCLID W. BOUSQUET.
HUBERT G. GUY.